(12) United States Patent
Moser (10) Patent No.: US 10,129,363 B2
(45) Date of Patent: Nov. 13, 2018

(54) PLUG-IN CACHE

(71) Applicant: SAP SE, Walldorf (DE)

(72) Inventor: Martin Moser, Speyer (DE)

(73) Assignee: SAP SE, Walldorf (DE)

( * ) Notice: Subject to any disclaimer, the term of this patent is extended or adjusted under 35 U.S.C. 154(b) by 668 days.

(21) Appl. No.: 14/725,568

(22) Filed: May 29, 2015

(65) Prior Publication Data

US 2016/0352858 A1    Dec. 1, 2016

(51) Int. Cl.
| | | |
|---|---|---|
| *G06F 15/16* | (2006.01) | |
| *H04L 29/08* | (2006.01) | |
| *G06F 12/0815* | (2016.01) | |
| *G06F 17/22* | (2006.01) | |
| *G06F 9/30* | (2018.01) | |

(52) U.S. Cl.
CPC ...... *H04L 67/2852* (2013.01); *G06F 12/0815* (2013.01); *G06F 9/30047* (2013.01); *G06F 17/2288* (2013.01); *G06F 2212/621* (2013.01); *H04L 67/2842* (2013.01)

(58) Field of Classification Search
CPC . H04L 67/2842; H04L 67/42; H04L 67/2852; H04L 67/1095; H04L 67/02; H04L 43/04; G06F 17/30902; G06F 17/30893; G06F 12/0815; G06F 12/084; G06F 2212/621; G06F 9/30047; G06F 17/2288
USPC .................................. 709/217, 219; 711/118
See application file for complete search history.

(56) References Cited

U.S. PATENT DOCUMENTS

| | | | | |
|---|---|---|---|---|
| 7,194,506 | B1 * | 3/2007 | White | G06F 17/30893 709/203 |
| 2006/0143256 | A1 * | 6/2006 | Galchev | G06F 12/084 |
| 2007/0101061 | A1 * | 5/2007 | Baskaran | G06F 17/30902 711/118 |
| 2010/0138485 | A1 * | 6/2010 | Chow | G06F 17/30902 709/203 |
| 2015/0324479 | A1 * | 11/2015 | Seidle, Jr. | H04L 67/02 715/234 |

(Continued)

OTHER PUBLICATIONS

"An update is available for Background Intelligent Transfer Service (BITS) 2.0 for Windows XP", © Microsoft 2015, [Online]. Retrieved from the Internet: <URL: https://support.microsoft.com/en-us/kb/842309>, (Accessed Aug. 26, 2015), 9 pgs.

(Continued)

*Primary Examiner* — Jungwon Chang
(74) *Attorney, Agent, or Firm* — Schwegman Lundberg & Woessner, P.A.

(57) ABSTRACT

An application may support the use of a plug-in. A plug-in may have an associated cache. The application may allow the plug-in to intercept network requests. The plug-in can determine if a network request is for an already-cached resource and provide the resource as a response to the intercepted network request. Additionally or alternatively, the application may allow the plug-in to make network requests. The plug-in can make a network request for data in order to add the data to the plug-in's cache. The plug-in may be able to determine when the application, the system, the network, or any suitable combination thereof are idle and cause cache requests to be made during idle periods.

19 Claims, 9 Drawing Sheets

(56) References Cited

U.S. PATENT DOCUMENTS

2016/0182673 A1* 6/2016 Kinarti ............... H04L 67/1095
709/219

OTHER PUBLICATIONS

"Apache Camel: Cache", The Apache Software Foundation, [Online]. Retrieved from the Internet: <URL: http://camel.apache.org/cache.html>, (Accessed Aug. 26, 2015), 5 pgs.

Kogman, Yuval, et al., "Catalyst-Plugin-Cache-search cpan: Module Version: 0.12", [Online]. Retrieved from the Internet: <URL: http://search.cpan.org/~bobtfish/Catalyst-Plugin-Cache-0.12/lib/Catalyst/Plugin/Cache.pm>, (Accessed Aug. 26, 2015), 7 pgs.

Naone, Eric, "Amazon's Cloud Gives Its New Browser an Unfair Edge: The Silk browser—developed for Amazon's Kindle Fire—could make for the fastest mobile browsing experience yet.", MIT Technology Review, (Oct. 3, 2011), 2 pgs.

Uzayr, Sufyan Bin, "8 Excellent WordPress Caching Plugins to Speed Up Your Site", [Online]. Retrieved from the Internet: <URL: http://sixrevisions.com/wordpress/caching-plugins/>, (Aug. 10, 2011), 18 pgs.

\* cited by examiner

PLUG-IN CACHE

TECHNICAL FIELD

The subject matter disclosed herein generally relates to the processing of data. Specifically, the present disclosure addresses systems and methods to improve computing performance using a plug-in cache.

BACKGROUND

Web browsers cache data used by web pages to reduce the amount of network traffic generated by rendering the same page multiple times. The cache for the web browser is shared across multiple web pages. When the size of the cache becomes too large or the amount of time elapsed since the last access of a particular web page becomes too long, the cached data for one or more web pages is deleted. After cached data is deleted, further access of that data requires retrieving the data from the remote server.

BRIEF DESCRIPTION OF THE DRAWINGS

Some embodiments are illustrated by way of example and not limitation in the figures of the accompanying drawings.

DETAILED DESCRIPTION

Example methods and systems are directed to a plug-in cache. The plug-in may be hosted by a web browser, a software application, an interactive development environment (IDE), an operating system, or any suitable combination thereof. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An application may use a cache to store and retrieve recently-used items, frequently-used items, or both. The application cache may serve to reduce network traffic by accessing the cached items from a local memory (e.g., a solid-state drive (SSD), random access memory (RAM), or hard disk) instead of requesting the items from a server over a network. Similarly, the application cache may serve to reduce database traffic by caching database query results in local or remote storage instead of requesting a database server to re-process the query.

The application may be used by multiple users or for multiple activities. For example, if the application is a web browser, the application may be used to access multiple web sites. Each web site may have different cacheable data (e.g., images, query results, widgets, or any suitable combination thereof). As a result, the application's cache may be used in a way that is not optimal for one or more of the web sites. For example, consider an application with a 20 MB cache used for three distinct activities, each of which has 10 MB of cacheable data. If the user rotates through the three activities in sequence, the cache will consistently hold the 20 MB of cacheable data corresponding to the two most-recent activities and none of the cacheable data corresponding to the next activity. Accordingly, each time the user switches to a new activity, the data for that activity will have to be reloaded.

The application may support the use of plug-ins. A plug-in is code or an executable object that provides functionality through a host application. For example, a plug-in may provide additional features, alter the functionality of existing features, or both. Similarly, a plug-in may provide additional menu options, remove menu options, alter menu options, or any suitable combination thereof. For example, a plug-in may open a tab in a browser and render its user interface in the tab using the rendering engine of the browser, its own rendering engine, or both. The plug-in may use the rendering engine of the browser by generating code (e.g., HTML, cascading style sheets (CSS), or JavaScript) and passing the code to the rendering engine of the browser. Additionally or alternatively, the plug-in may use the rendering engine of the browser by modifying the domain object model (DOM) used by the browser. A rendering engine of the plug-in may be wholly or partially implemented using a native UI control library of the plug-in. A plug-in may correspond to one or more activities of the application.

A plug-in may have an associated cache. The cache for the plug-in may store scripts, executable objects, CSS, data, or any suitable combination thereof used by the plug-in. In some example embodiments, this provides better results than the application cache. For example, if three plug-ins were each allotted one third of the 20 MB cache discussed above, each plug-in would cache two thirds of its cacheable data and load only one third of its data each time the corresponding activity is begun. Thus, in this example, providing plug-in-level cache control instead of application-level cache control would reduce network traffic by about two thirds. A rendering engine of the plug-in may be stored in the cache associated with the plug-in. Alternatively or additionally, the rendering engine of the plug-in may be part of the plug-in itself. In such embodiments, the rendering engine of the plug-in may be updated, along with the plug-in code, using a plug-in update feature of the application.

The application may allow the plug-in to intercept network requests. The plug-in can determine if a network request is for an already-cached resource and provide the resource as a response to the intercepted network request. Additionally or alternatively, the application may allow the plug-in to make network requests. The plug-in can make a network request for data in order to add the data to the plug-in's cache. The plug-in may be able to determine when the application, the system, the network, or any suitable combination thereof are idle and cause cache requests to be made during idle periods. In some example embodiments, this allows resources to be more efficiently used by reducing the load on the system by retrieving cached resources during busy periods, and making use of otherwise-idle resources during periods of low demand.

Figure 1:
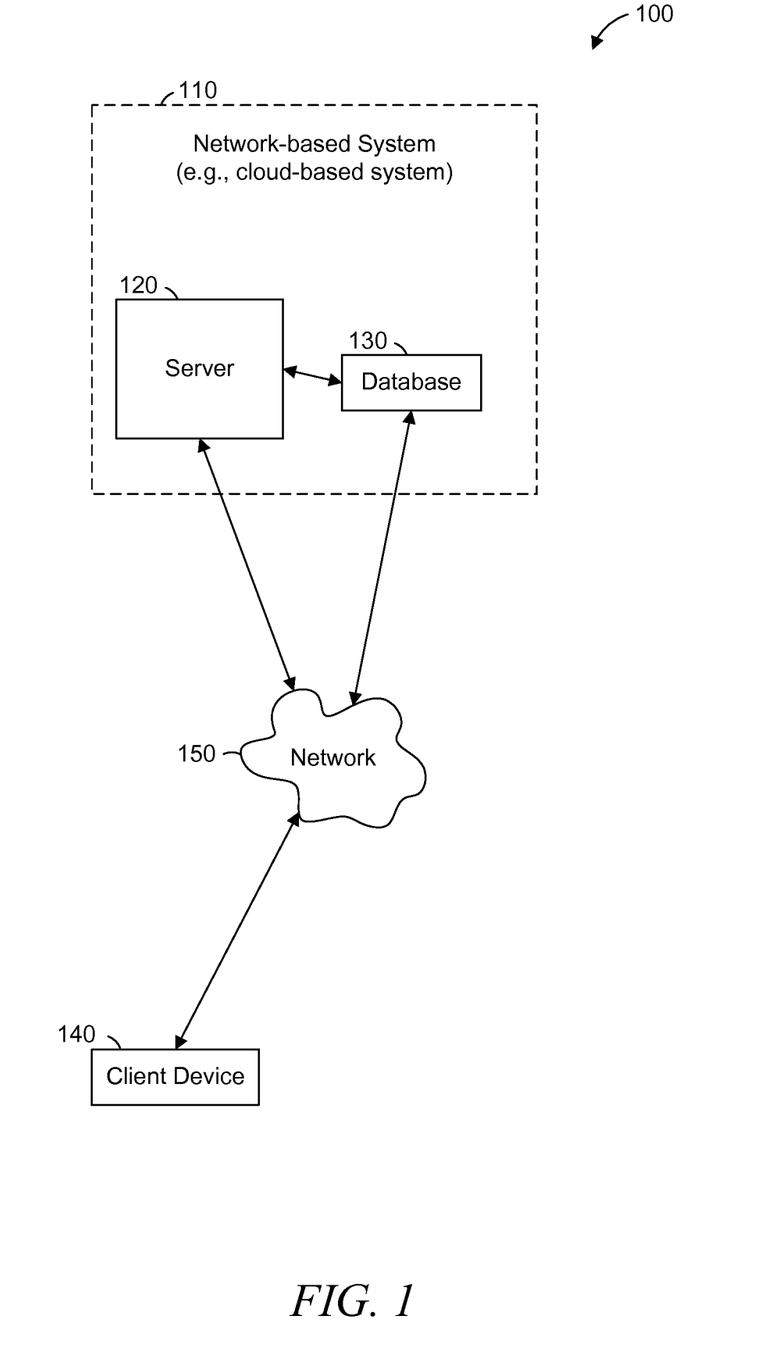
FIG. 1 is a network diagram illustrating a network environment suitable for implementing a plug-in cache, according to some example embodiments.

FIG. 1 is a network diagram illustrating a network environment 100 suitable for implementing a plug-in cache, according to some example embodiments. The network environment 100 includes a server machine 120, a database 130, a client device 140, and a network 150. The server machine 120 and the database 130 may collectively comprise a network-based system 110 (e.g., a cloud-based system) capable of providing data to be stored in a cache of a plug-in to an application on the client device 140. The client device 140 receives the data from the network-based system 110 and caches the data in a memory of the client device 140. The server machine 120 may host an application capable of dispatching data and database queries to the database 130. The server machine 120, the database 130, and the client device 140 may each be implemented in a computer system, in whole or in part, as described below with respect to FIG. 9.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, document-oriented NoSQL databases, a file store, or any suitable combination thereof. The database may be an in-memory database. Moreover, any two or more of the machines, databases, or devices illustrated in FIG. 1 may be combined into a single machine, and the functions described herein for any single machine, database, or device may be subdivided among multiple machines, databases, or devices.

The network-based system 110 and the client device 140 are connected by the network 150. The network 150 may be any network that enables communication between or among machines, databases, and devices. Accordingly, the network 150 may be a wired network, a wireless network (e.g., a mobile or cellular network), or any suitable combination thereof. The network 150 may include one or more portions that constitute a private network, a public network (e.g., the Internet), or any suitable combination thereof.

Figure 2:
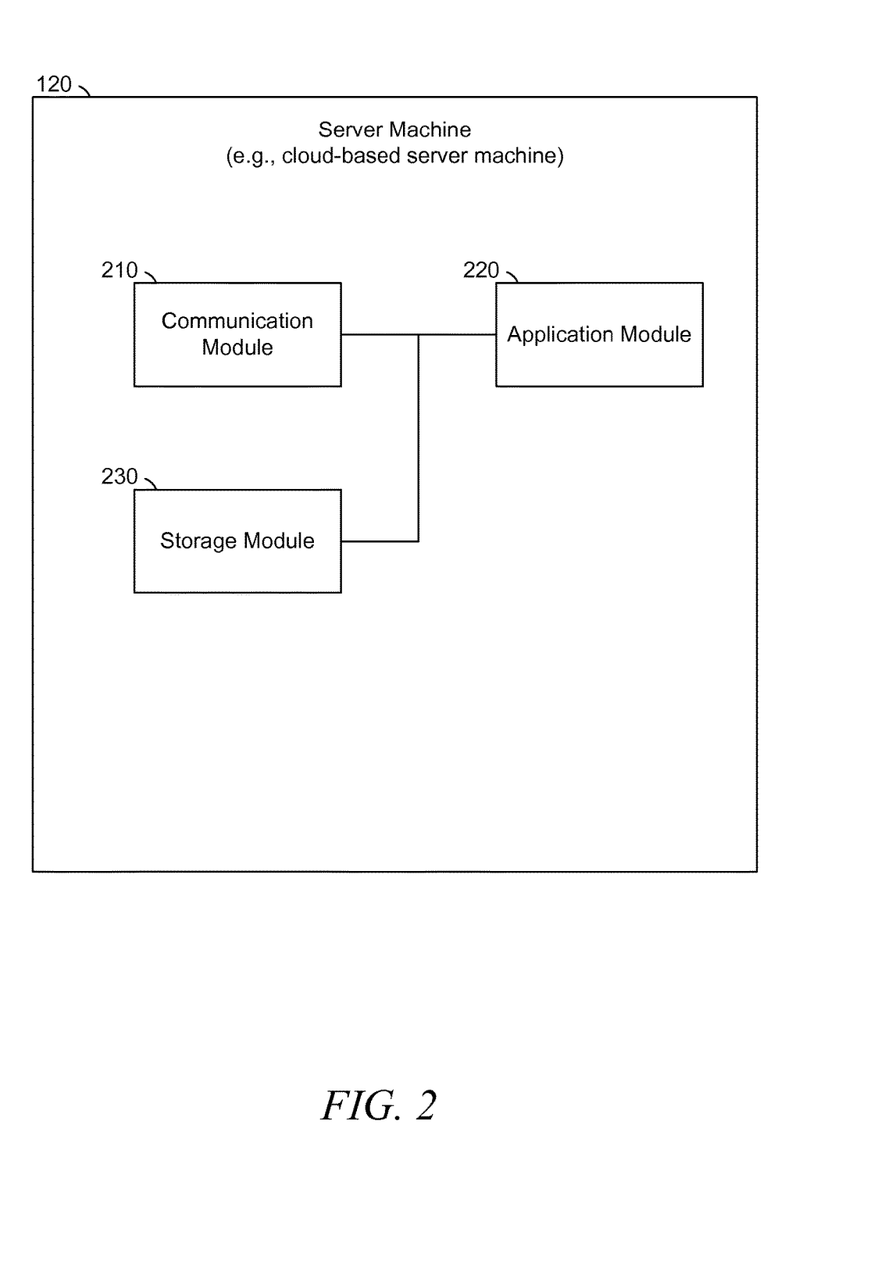
FIG. 2 is a block diagram of a server machine, according to some example embodiments, suitable for supporting a plug-in cache.

FIG. 2 is a block diagram illustrating components of the server machine 120, according to some example embodiments. The server machine 120 is shown as including a communication module 210, an application module 220, and a storage module 230, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the server machine 120 and transmits data from the server machine 120. For example, requests for data or code may be received from the client device 140 for use in presenting a user interface to a user. Requests for data, code, or executable objects to be used in an application, cached on the client device, or both may also be received from the client device 140. Requests for data to be cached may be marked as cache requests (e.g., using a field in the request, an element in a uniform resource locator (URL) identifying the requested data, a parameter sent to a computer gateway interface (CGI) script, or any suitable combination thereof) to distinguish them from requests for data to be processed without caching.

The application module 220 processes the received requests and generates appropriate responses to be sent to the client device 140 by the communication module 210. For example, the application module 220 may implement a web server that responds to hypertext transport protocol (HTTP) requests and generates HTTP responses. Responses containing data to be cached may be marked (e.g., using a header field) to distinguish them from data to be used for immediate processing by the client device 140.

The storage module 230 stores data used for some or all responses provided by the application module 220. Additionally, the storage module 230 may store some or all requests received from the client device 140. For example, data for web pages and plug-ins may be stored via the storage module 230 in one or more files or databases.

Figure 3:
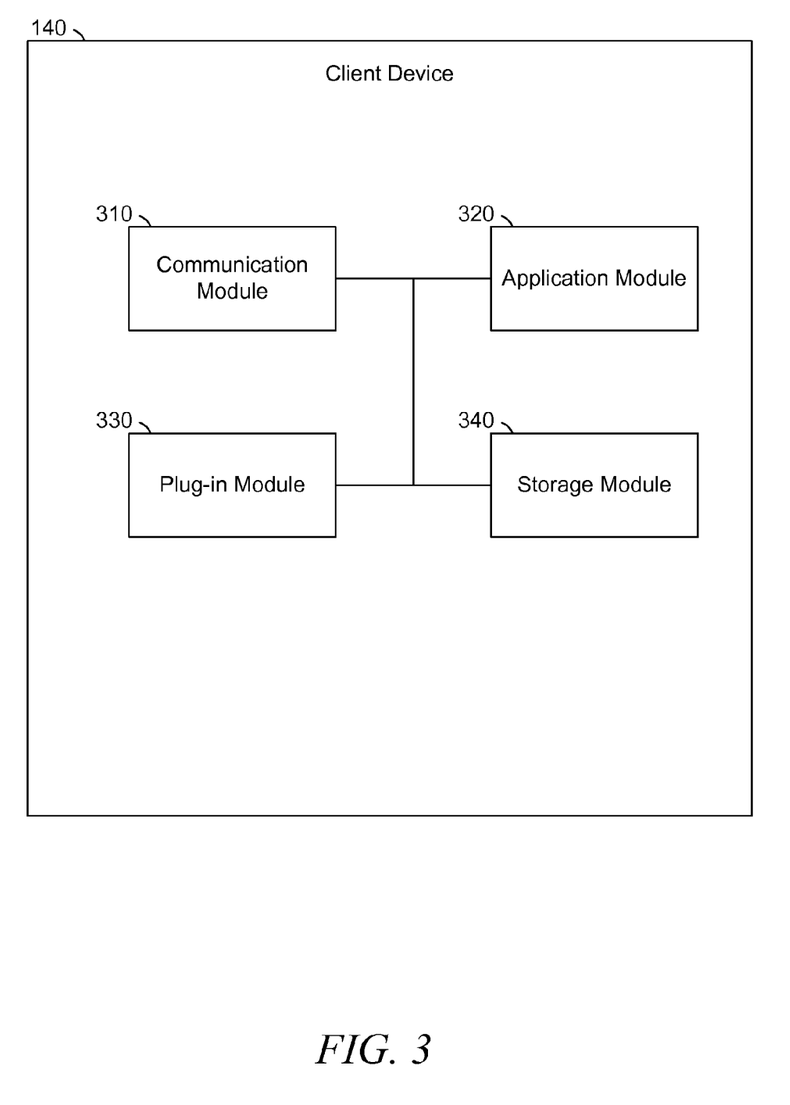
FIG. 3 is a block diagram of a client machine, according to some example embodiments, suitable for implementing a plug-in cache.

FIG. 3 is a block diagram of a client machine, according to some example embodiments, suitable for implementing a plug-in cache. The client device 140 is shown as including a communication module 310, an application module 320, a plug-in module 330, and a storage module 340, all configured to communicate with each other (e.g., via a bus, shared memory, or a switch).

The communication module 310 receives data sent to the client device 140 and transmits data from the client device 140. For example, a data request (e.g., an HTTP request) may be sent from the client device 140 to the server machine 120. The requests sent by the communication module 310 may be generated by the application module 320, the plug-in module 330, or both. In some example embodiments, the application module 320 or the plug-in module 330 initiates the data request and the communication module 310 executes the data request. In other example embodiments, the application module 320 or the plug-in module 330 initiates and completes the data request.

The application module 320 implements an application on the client device 140. For example, the application may be a word processing application, a web browser application, a spreadsheet application, or any suitable combination thereof. The application may generate instructions to a graphics processor which, in turn, causes a user interface to be presented on a screen (e.g., a liquid crystal display (LCD) screen, a cathode ray tube (CRT) screen, or multiple display devices that combine to create a logical screen).

The plug-in module 330 extends or modifies the application implemented by the application module 320. For example, the plug-in module 330 may provide additional menu options to a user, data processing options to the application, or both. The storage module 340 stores data in a memory of the client device 140, retrieves data from the memory of the client device 140, or both. The storage module 340 may store cached data for the application module 320, the plug-in module 330, or both.

According to various example embodiments, one or more of the methodologies described herein may facilitate caching of data used by a plug-in. Control of a cache by a plug-in may provide reduced network access, faster loading times, faster rendering times, reduced processor use, or any combination thereof.

When these effects are considered in aggregate, one or more of the methodologies described herein may obviate a need for certain efforts or resources that otherwise would be involved in providing features of an application. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 4:
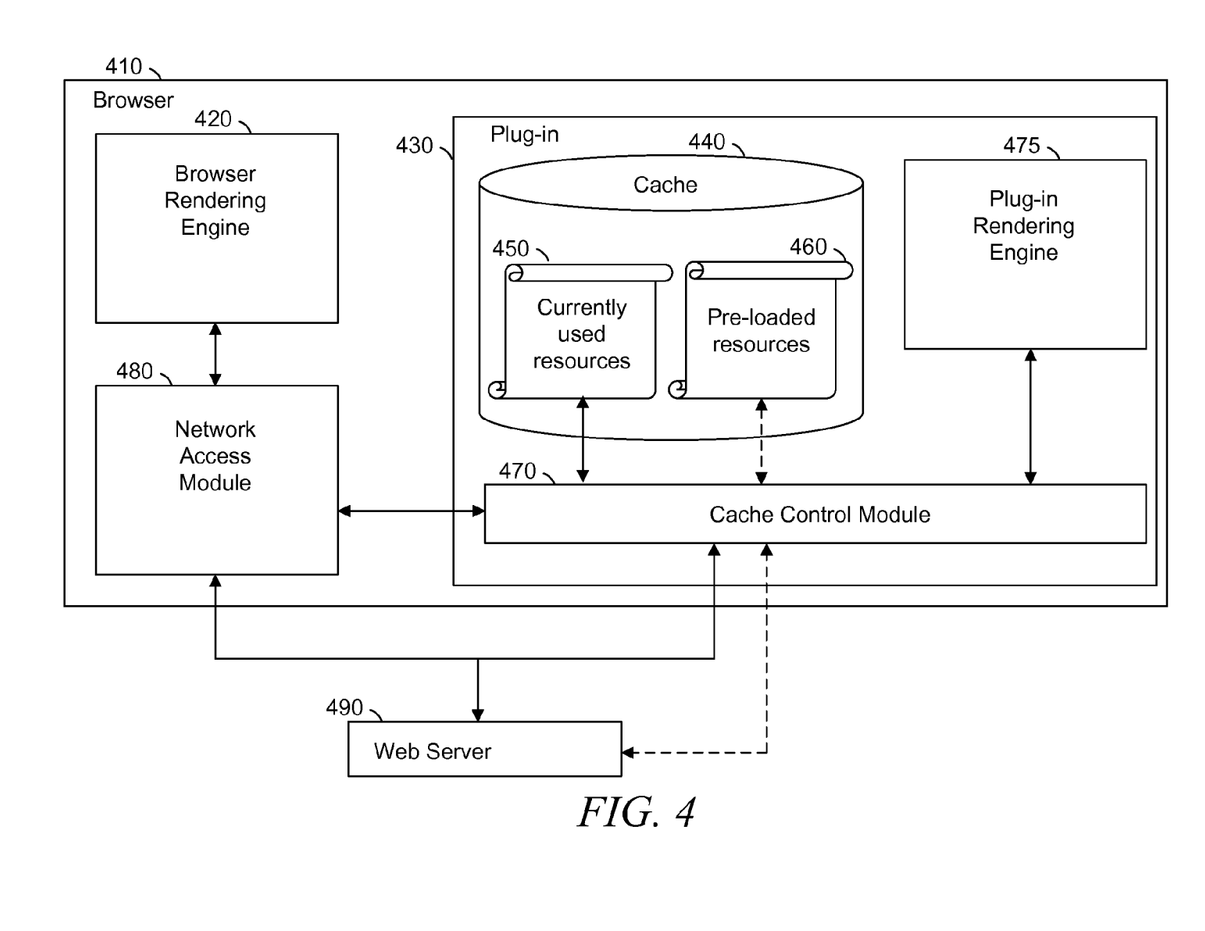
FIG. 4 is a block diagram of elements of client and server machines, according to some example embodiments, suitable for implementing a plug-in cache.

FIG. 4 is a block diagram of elements of client and server machines, according to some example embodiments, suitable for implementing a plug-in cache. FIG. 4 shows a logical relationship between the application module 320, the plug-in module 330, and the network-based system 110, exemplified in FIG. 4 as a browser 410, a plug-in 430, and a web server 490, respectively. As shown in FIG. 4, the browser 410 includes a rendering engine 420, network access module 480, and the plug-in 430. The plug-in 430 includes a cache 440 and a cache control module 470. As shown, the cache control module 470 is a subcomponent of the plug-in 430. Alternatively, the cache control module 470 may be implemented as a separate module from the plug-in 430 and be configured to receive instructions from the plug-in 430. The cache 440 stores currently used resources 450 and pre-loaded resources 460.

The browser rendering engine 420, the plug-in rendering engine 475, or both, render data received from the web server 490 via the network access module 480 for display as a web page. The cache control module 470 interacts with the network access module 480 to provide access to the cache 440 for resources stored in the cache 440. Data requests received by the cache control module 470 for data not in the cache 440 are directed to the web server 490 for fulfillment. Cacheable data received from the web server 490 may be stored in the cache 440 by the cache control module 470 as currently used resources 450. Dashed lines connecting the web server 490, the cache control module 470, and the pre-loaded resources 460 indicate a data connection that pre-loads the cache 440 with data at the time the plug-in 430 is installed. In alternative embodiments, the pre-loaded resources 460 are populated after the plug-in is installed (e.g., through a later network connection), with the installation of the plug-in (e.g., as part of the data package containing the plug-in), or not populated at all.

In some example embodiments, the browser 410 includes an installation mechanism for installing plug-ins. In other example embodiments, the installation of the plug-in is performed by a separate application. For example, the plug-in 430 may be installed using an installation application other than the browser 410 that places plug-in object files in a location accessible by the browser 410, alters a configuration of the browser 410 such that the browser 410 will load the plug-in 430, or both. During execution of the installation application, the web server 490 may be contacted and a request for the pre-loaded resources 460 sent. In response, the web server 490 may send the resources, which are stored in the cache 440. After installation of the plug-in 430, the cache control module 470 may access the pre-loaded resources 460 and provide them to the plug-in 430, the browser 410, or both.

In some example embodiments, a UI generated by the plug-in 430 may be displayed on a display of the client device 140 via the browser rendering engine 420. For example, the plug-in 430 may generate or modify a domain object model which is processed by the browser rendering engine 420 to generate a native user interface under an operating system of the client device 140. Alternatively or additionally, a UI generated by the plug-in 430 may be displayed on the display device via the plug-in rendering engine 475. For example, the plug-in 430 may generate the native user interface under the operating system of the client device 140 without going through the intermediate step of generating or modifying a domain object model. In some example embodiments, using the browser rendering engine 420 simplifies the development, reduces the size, or both, of the plug-in 430, which may not include the plug-in rendering engine 475. In some example embodiments, using the plug-in rendering engine 475 improves the performance of the plug-in 430, reduces consumption of resources of the client device 140, or both.

The currently used resources 450 or pre-loaded resources 460 may include locally-generated data or code. For example, code (e.g., JavaScript code) used by the plug-in 430 may be received from the web server 490 and compiled using a compiler (e.g., a just-in-time (JIT) compiler) of the browser 410 or the plug-in 430. The compiled code may be stored in the cache 440. As a result, future uses of the received code from the cache 440 avoid both the receiving of the code over the network and the compiling of the code. In some example embodiments, the execution of the compiled code generates image data for display to the user, avoiding or reducing the generation of HTML to be processed by the browser 410 for the generation of display data.

In some example embodiments, multiple plug-ins 430 are present. Each plug-in 430 may have a separate cache 440 and a separate or shared cache control module 470. Data requests for data to be cached by a plug-in 430 may be marked in a way that identifies the particular plug-in 430 that is making the request. For example, each plug-in 430 may have a unique identifier that is passed in the data request that identifies the plug-in 430 to the web server 490.

Figure 5:
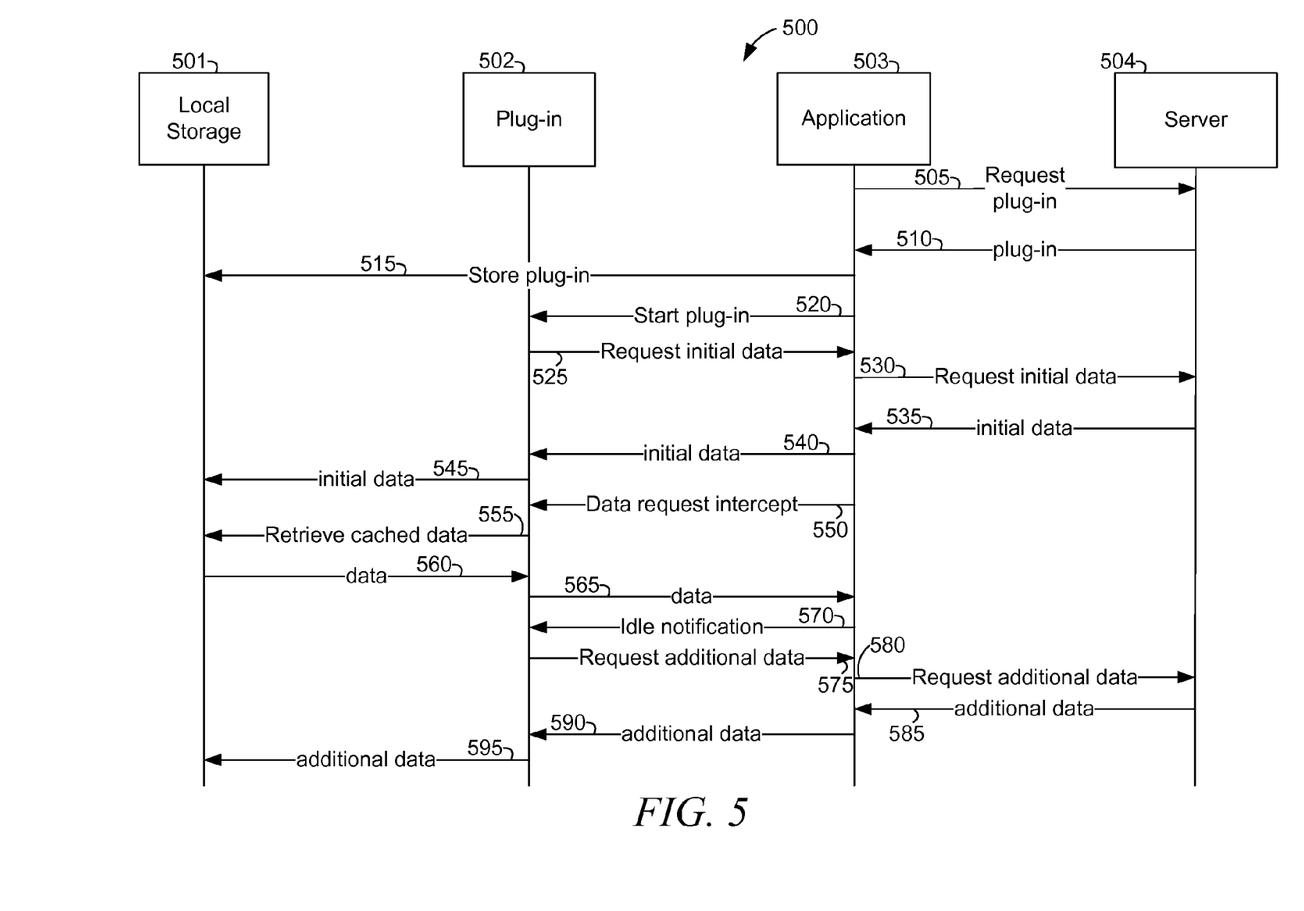
FIG. 5 is a flow diagram illustrating communications between client and server components, according to some example embodiments, suitable for implementing a plug-in cache.

FIG. 5 is a flow diagram 500 illustrating communications between client and server components, according to some example embodiments, suitable for implementing a plug-in cache. By way of example and not limitation, the flow diagram 500 is described as being implemented by the machines and systems described in FIGS. 1-4. The flow diagram 500 shows data flow via the steps 505-595 representing data communications between a local storage 501 (e.g., the storage module 340 or the cache 440), a plug-in 502 (e.g., the plug-in module 330 or the plug-in 430), an application 503 (e.g., the application module 320 or the browser 410), and a server 504 (e.g., the network-based system 110 or the web server 490).

In step 505, the application 503 requests a plug-in from the server 504. The server 504 responds to the request by providing the plug-in (step 510). After receiving the plug-in, the application 503 stores the plug-in in local storage 501 (step 515). In some example embodiments, the plug-in 502 includes initial data. In these embodiments, steps 525-545 may be skipped. Application 503 starts the installed plug-in (step 520), at which point the plug-in 502 becomes active. As shown in FIG. 5, the plug-in then requests initial data via the application 503 (step 525). In some example embodiments, the plug-in 502 requests the initial data without going through the application 503 (e.g., by communicating with a network access device without informing the application). The request for initial data may comprise a notification to the server 504 that includes an identifier for the plug-in 502 and a previous update date. For the initial data, the previous update date may be set to a null value or a date far in the past (e.g., Jan. 1, 1900). Accordingly, the server 504 is able to determine that all available cacheable data for the plug-in 502 is newer than the last update for the plug-in 502. In embodiments in which initial data was included in the plug-in, the previous update date may be determined based on the included initial data (e.g., using a date stored in the included initial data). A general request for available cacheable data can be made at later times by using an updated previous update date value. For example, if the initial data is retrieved on Jun. 1, 2015, a request can later be made that identifies the previous update date as Jun. 1, 2015 to retrieve any data added on the server 504 after that date. The plug-in 502 would then update the previous update date to reflect the date on which the updated data was retrieved from the server 504.

Application 503 forwards the request for initial data for the plug-in 502 to the server 504, in step 530. The initial data is transferred from the server 504 to the application 503, which provides the initial data to the plug-in 502, which stores the initial data in the local storage 501 (steps 535-545). In embodiments in which the plug-in 502 does not communicate to the server 504 via the application 503, the initial data is transferred from the server 504 to the plug-in 502, without intervention by the application 503. Thus, after step 545 is complete, the plug-in 502 is installed (e.g., on the client device 140) and the initial data (e.g., the pre-loaded resources 460 or a portion thereof) is stored.

During operation of the application 503 with the plug-in 502, the plug-in 502 intercepts a data request made by the application 503 (step 550). For example, the application 503 may inform the plug-in 502 of the data request using a callback function registered by the plug-in 502 using a plug-in framework of the application 503. As another example, the plug-in 502 may implement a network driver in the operating system through which the network access requests by the application 503 pass.

In response to the interception of the data request, the plug-in 502 retrieves cached data (step 555) from the local storage 501. For example, the plug-in 502 may determine that the data request intercepted in step 550 may be satisfied by data stored in the local storage 501. Providing the response from the local storage 501 may eliminate or reduce the need to use network resources or other more costly resources to satisfy the request. In steps 560 and 565, the data is transferred from the local storage 501 to the application 503, under the control of the plug-in 502. In some example embodiments, the request for data from the local storage 501 is intermediated by the cache control module 470.

In a related or separate sequence, the application 503 notifies the plug-in 502 that the application 503 or the client device 140 is idle (step 570). In some example embodiments, the plug-in 502 performs the idle determination itself, without involvement of the application 503. The idle determination may be based on low CPU usage, low network usage, low hard disk usage or any suitable combination thereof. In response to the idle determination, the plug-in 502 determines whether or not to request additional data. For example, data in the local storage 501 may be associated with an expiration date which has passed, thus being ready to be replaced with newer data. In some example embodiments, the expired data is used in generating the look-and-feel of the plug-in and the newer data is used in generating a replacement look-and-feel. As another example, the plug-in 502 may communicate with the server 504 to determine if additional resources that are not currently stored are available for storage. After determining to request additional data, the plug-in 502 makes a request to the server 504, via the application 503 (steps 575 and 580). In response, the server 504 sends the additional data for storage in the local storage 501 (steps 585-595).

Figure 6:
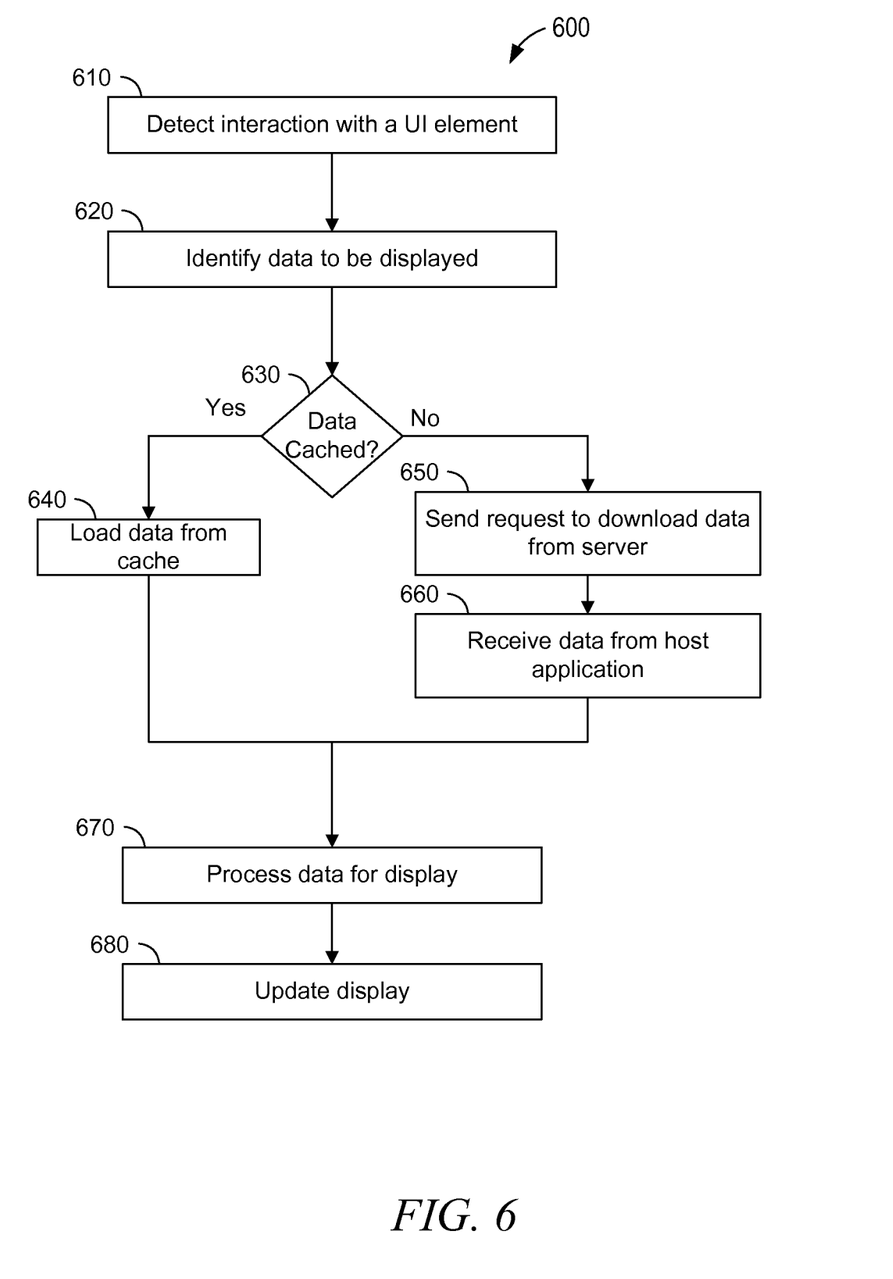
FIG. 6 is a flowchart illustrating operations, according to some example embodiments, suitable for implementing a plug-in cache.

FIG. 6 is a flowchart illustrating operations of a method 600, according to some example embodiments, suitable for implementing a plug-in cache. By way of example and not limitation, the method 600 is described as being performed by the client device 140 using the modules shown in FIG. 3.

In operation 610, the plug-in module 330 or the application module 320 detects an interaction with a UI element. For example, the UI element may be operable to cause some currently-displayed information to be hidden and other information to be displayed. In operation 620, the data to be displayed is identified by the plug-in module 330 or the application module 320. For example, one or more hypertext markup language (HTML) files, image files, multimedia files, or any suitable combination thereof, may be indicated as being part of the information to be displayed. The plug-in module 330 determines if the data is already cached, in operation 630. In some example embodiments, operation 630 includes checking a release date of the cached data. If the data is cached but the release date has not been reached, the data may be treated as though it were not cached. For example, a rendering library (e.g., JavaScript rendering code) may have been downloaded and cached during idle processing time even though it will not be released for use until a specified date (e.g., Jan. 1, 2016). Accordingly, until that date is reached, the rendering library will not be used. However, after the release date is reached, the rendering library will be available for immediate use, since it will have already been stored on the client device 140.

If the data is already cached and available for use, it is retrieved from the cache (operation 640) and the method 600 proceeds to the operation 670. If the data is not already cached, the plug-in module 330 sends a request, in operation 650, to download the data from a server (e.g., the network-based system 110). In some example embodiments, the request is sent via the host application (e.g., the application module 320). The plug-in module 330 may determine that the data is cacheable and mark the request as a cache request. The plug-in module 330 receives the requested data in operation 660 and the method 600 continues with operation 670. In some example embodiments, the server may respond to the data request with data marked for caching, even if the data request was not marked as a cache request.

In operation 670, the plug-in module 330 or the application module 320 processes the data for display. When the received data is marked for caching, the data may be stored in the cache in addition to or instead of being processed for display. The processed data is then used to update the display (operation 680), in accordance with the interaction of operation 610.

Figure 7:
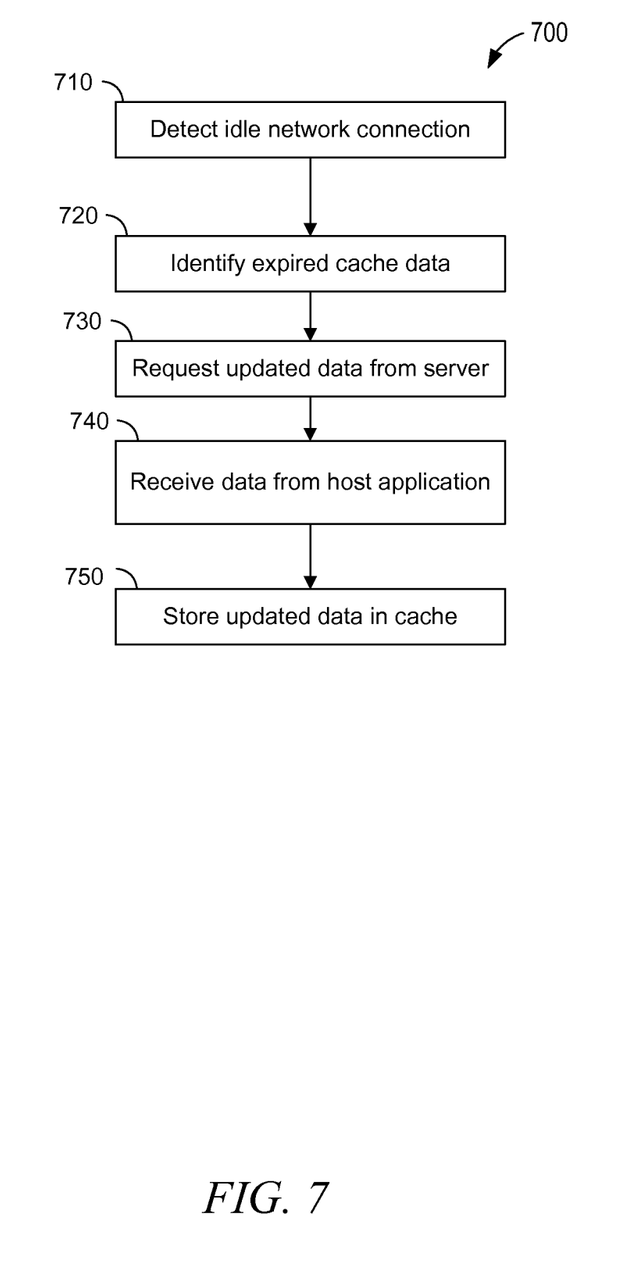
FIG. 7 is a flowchart illustrating operations, according to some example embodiments, suitable for implementing a plug-in cache.

FIG. 7 is a flowchart illustrating operations of a method 700, according to some example embodiments, suitable for implementing a plug-in cache. By way of example and not limitation, the method 700 is described as being performed by the client device 140 using the modules shown in FIG. 3.

In operation 710, the plug-in module 330 detects an idle network connection. For example, the plug-in module 330 may query an operating system of the client device 140, query the application module 320, receive a notification from the operating system of the client device 140, receive a notification from the application module 320, or any suitable combination thereof. In operation 720, the plug-in module 330 identifies one or more items in the cache that have expired. For example, data previously stored in a cache via the storage module 340 may have been tagged with an expiration date that has passed, data previously stored in the cache may have been tagged with a storage date which, in combination with a predetermined use period, indicates that the data has expired, or any suitable combination thereof.

The plug-in module 330 requests updated data to replace the expired data from the network-based system 110 via the application module 320 (operation 730) and receives the requested data (operation 740), which is then stored in the cache for the plug-in (operation 750). For example, the updated data may be an updated version of the expired item (e.g., a newer virus definition file, a newer rendering library, updated map data, or any suitable combination thereof). The updated data may modify or replace the expired item. For example, the updated data may add additional data to the item (e.g., additional virus signatures) or replace the item entirely (e.g., a substitute rendering engine). In some example embodiments, the plug-in module 330 is able to directly access the network connection and thus both send the data request to the network-based system 110 and receive the data from the network-based system 110. In other example embodiments, the plug-in module 330 does not directly access the network connection but instead operates using its host application (e.g., the application module 320) as an intermediary.

Figure 8:
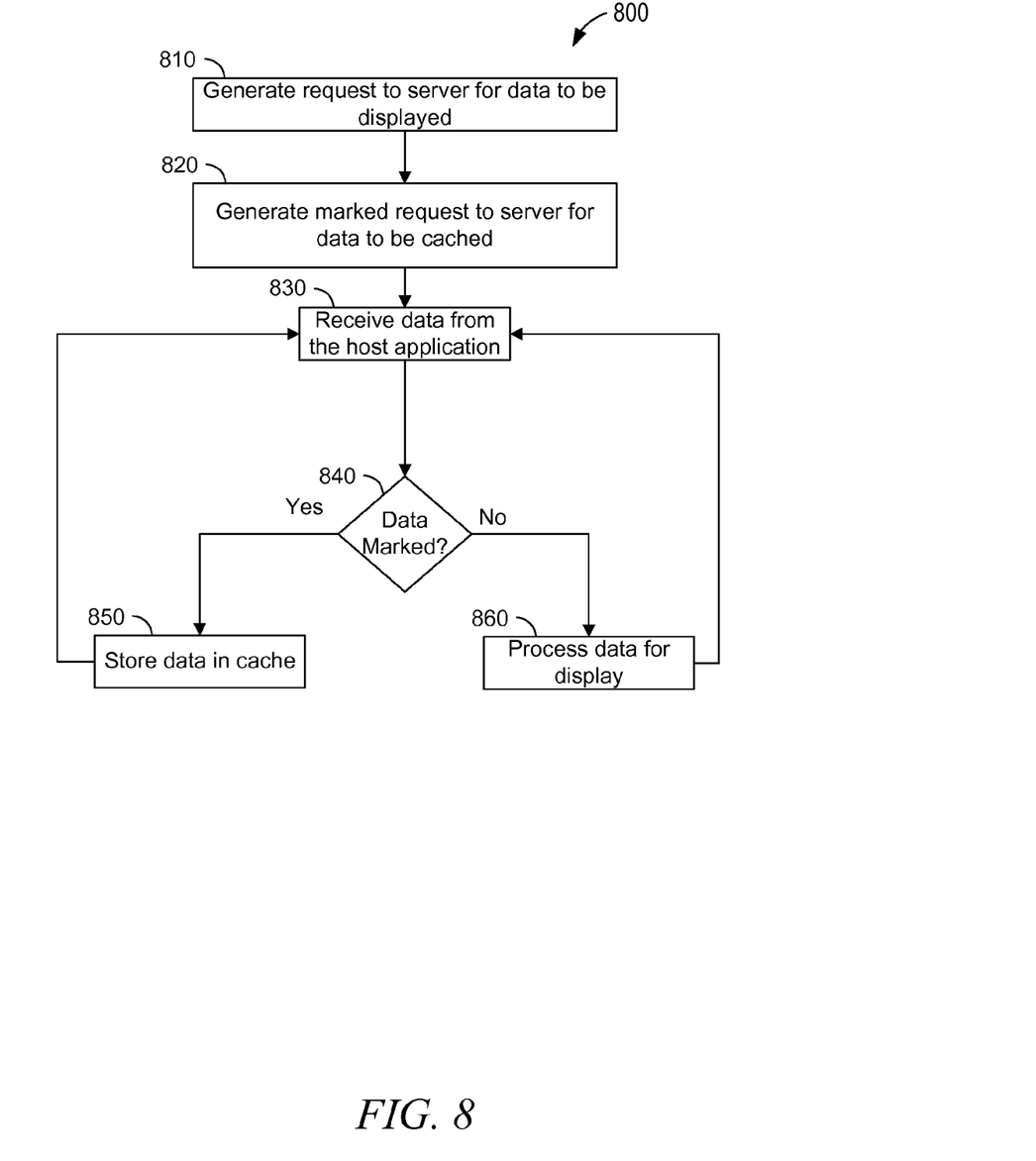
FIG. 8 is a flowchart illustrating operations, according to some example embodiments, suitable for implementing a plug-in cache.

FIG. 8 is a flowchart illustrating operations of a method 800, according to some example embodiments, suitable for implementing a plug-in cache. By way of example and not limitation, the method 800 is described as being performed by the client device 140 using the modules shown in FIG. 3.

In operation 810, the plug-in module 330 generates a request to a server for data to be displayed. In some example embodiments, the requests from the plug-in module 330 are sent via the application module 320. In operation 820, the plug-in module 330 generates a request to the server for data to be cached. The request of operation 820 is marked as a cache request. In some example embodiments, multiple servers are used to satisfy data requests. One or more of the servers may be configured to provide exclusively cacheable data and other ones of the servers configured to provide exclusively non-cacheable data. In such a configuration, identification of the server to which the data request is directed is sufficient to constitute a marking of the data request as a cache request, when the server is one of the one or more servers configured to provide cacheable data.

Data is received by the plug-in module 330 from the host application in operation 830. If the data is marked as a cache response, it is stored in the cache for the plug-in (operations 840 and 850). If the data is not marked as a cache response, it is processed for display (operations 840 and 860). In either case, the method 800 returns to the operation 830, to await the supply of the remaining requested data. A cache response may include an expiration date, after which date the cached data will have expired, which may trigger the plug-in module 330 to request updated data.

Figure 9:
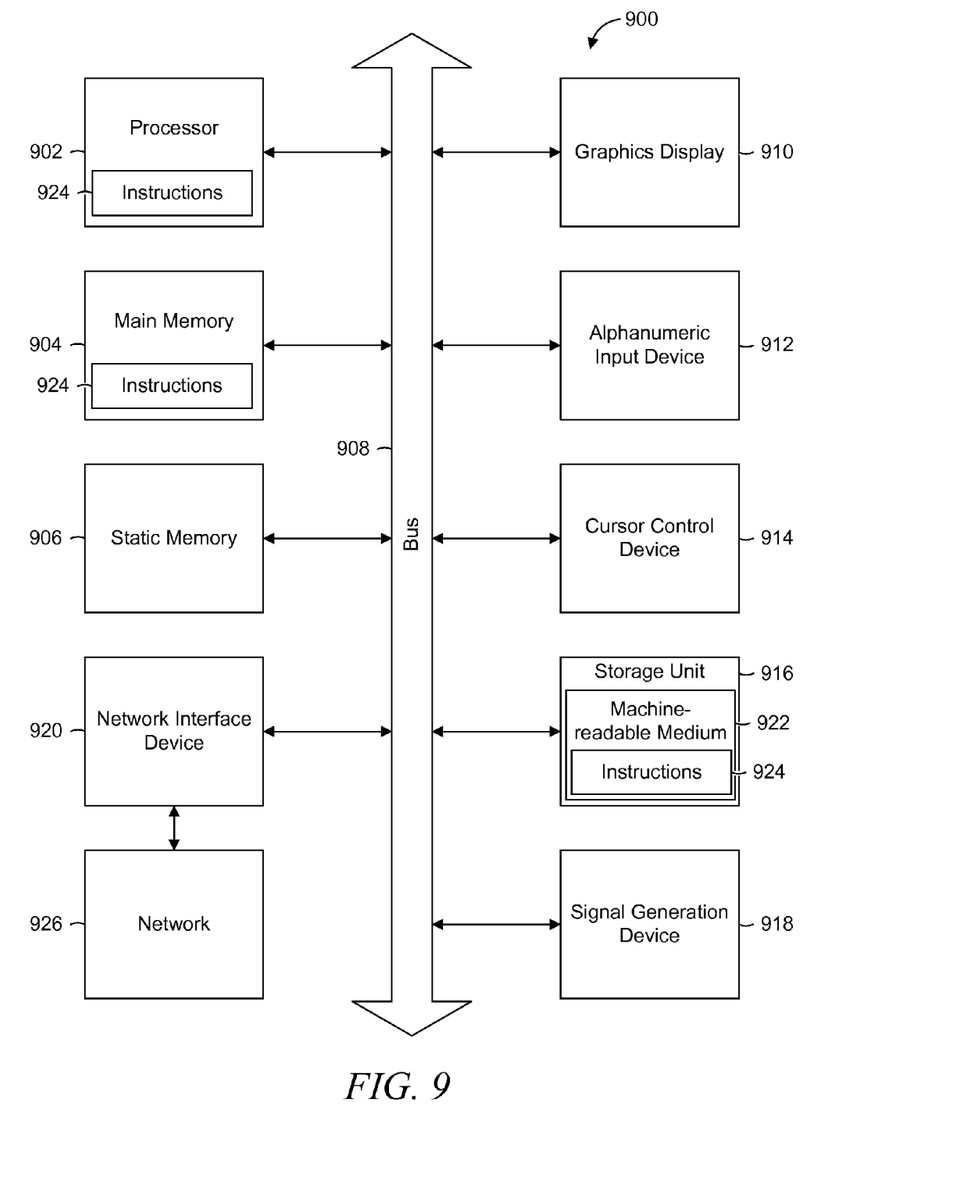
FIG. 9 is a block diagram illustrating components of a machine, according to some example embodiments.

FIG. 9 is a block diagram illustrating components of a machine 900, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed, in whole or in part. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   a memory comprising instructions; and
   one or more processors configured by the instructions to implement:
      an application module;
      a cache control module; and
      a plug-in module implemented by one or more hardware processors, the plug-in module being configured to:
         determine that an item in a memory has expired;
         determine that the application module is idle;
         in response to the application module being idle, initiate a data request, for an updated version of the expired item, to the application module, the data request being marked as a cache request;
         responsive to the data request, receive data from the application module, the received data being marked as a cache response; and
         responsive to receiving the received data, request the cache control module to update the expired item with the received data;
      the cache control module being configured to:
         receive instructions from the plug-in module;
         store data provided by the plug-in module in a memory; and
         retrieve data from the memory for access by the plug-in module;
      the application module being configured to, prior to making a second data request, inform the plug-in module of the second data request; and
      the plug-in module being further configured to:
         based on whether data responsive to the second data request is stored in the memory, either:
            allow the second data request to proceed without modification;
            or request the data responsive to the second data request from the cache control module, and provide the data responsive to the second data request to the application module.

2. The system of claim 1, wherein:
   the application module is configured to communicate with a plurality of servers, a first server of the plurality of servers being configured to provide exclusively cacheable data;
   the data request indicates that the updated version of the expired item is to be retrieved from the first server; and
   the data request being marked as a cache request comprises the indication that the updated version of the expired item is to be retrieved from the first server.

3. The system of claim 1, wherein the plug-in module is further configured to:
   determine that the system is idle; and
   wherein the initiating of the data request is further in response to the determination that the system is idle.

4. The system of claim 1, wherein the expired item is data.

5. The system of claim 1, wherein the expired item is code.

6. The system of claim 1, wherein the received data includes an expiration date.

7. A method comprising:
   determining, by a plug-in implemented by one or more hardware processors of a machine, that an item in a cache has expired;
   determining, by the plug-in, that an application is idle;
   in response to the application being idle, initiating, by the plug-in, a data request to the application for an updated version of the expired item, the data request being marked as a cache request;
   responsive to the data request, receiving data from the application, the received data being marked as a cache response;
   responsive to receiving the received data, updating the cache with the received data;
   receiving, by the plug-in, a notification from the application of a second data request, the notification being received prior to the second data request being sent over a network;
   determining whether data responsive to the second data request is stored in the cache; and based on the determination, either:
      allowing the second data request to proceed without modification; or
      accessing the data responsive to the second data request in the cache, and
         providing the data responsive to the second data request to the application.

8. The method of claim 7, wherein:
   the application is configured to communicate with a plurality of servers, a first server of the plurality of servers being configured to provide exclusively cacheable data;
   the data request indicates that the updated version of the expired item is to be retrieved from the first server; and
   the data request being marked as a cache request comprises the indication that the updated version of the expired item is to be retrieved from the first server.

9. The method of claim 7, further comprising:
determining that the machine is idle; and
wherein the initiating of the data request is further in response to the determination that the machine is idle.

10. The method of claim 7, wherein the expired item is data.

11. The method of claim 7, wherein the expired item is code.

12. The method of claim 7, wherein the received data includes an expiration date.

13. A non-transitory machine-readable storage medium comprising instructions that, when executed by one or more processors of a machine, cause the machine to perform operations comprising:
determining, by a plug-in module, that an item in a cache has expired;
determining, by the plug-in module, that an application is idle;
in response to the application being idle, initiating a data request to the application for an updated version of the expired item, the data request being marked as a cache request;
responsive to the data request, receiving data from the application, the received data being marked as a cache response;
responsive to receiving the received data, updating the cache with the received data;
receiving, by the plug-in module, a notification from the application of a second data request, the notification being received prior to the second data request being sent over a network;
determining whether data responsive to the second data request is stored in the cache; and based on the determination, either:
allowing the second data request to proceed without modification; or
accessing the data responsive to the second data request in the cache, and providing the data responsive to the second data request to the application.

14. The non-transitory machine-readable storage medium of claim 13, wherein:
the application is configured to communicate with a plurality of servers, a first server of the plurality of servers being configured to provide exclusively cacheable data;
the data request indicates that the updated version of the expired item is to be retrieved from the first server; and
the data request being marked as a cache request comprises the indication that the updated version of the expired item is to be retrieved from the first server.

15. The non-transitory machine-readable storage medium of claim 13, wherein:
the application is configured to communicate with a plurality of servers, a first server of the plurality of servers being configured to provide exclusively cacheable data;
the data request indicates that the updated version of the expired item is to be retrieved from the first server; and
the data request being marked as a cache request comprises the indication that the updated version of the expired item is to be retrieved from the first server.

16. The non-transitory machine-readable storage medium of claim 13, wherein the plug-in module is further configured to:
determine that the machine is idle; and
wherein the initiating of the data request is further in response to the determination that the machine is idle.

17. The non-transitory machine-readable storage medium of claim 13, wherein the expired item is data.

18. The non-transitory machine-readable storage medium of claim 13, wherein the expired item is code.

19. The non-transitory machine-readable storage medium of claim 13, wherein the received data includes an expiration date.

* * * * *